United States Patent [19]

Morohashi et al.

[11] 4,269,869

[45] May 26, 1981

[54] METHOD FOR IMPROVING SURFACE PROPERTIES OF POROUS INORGANIC MATERIAL BY COATING

[75] Inventors: Yasushi Morohashi, Tokyo; Yasuji Komatsu, Hoya; Toshiaki Hanyuda, Yokohama; Eiichiro Takiyama, Kamakura; Tohei Horishima, Koganei; Kenji Sugimoto, Chigasaki, all of Japan

[73] Assignees: Showa Highpolymer Co., Ltd.; Taisei Corporation, both of Tokyo, Japan

[21] Appl. No.: 96,167

[22] Filed: Nov. 20, 1979

[51] Int. Cl.$^3$ .............................................. B05D 3/06
[52] U.S. Cl. .............................. 427/54.1; 204/159.14; 526/266; 526/268
[58] Field of Search ................... 427/44, 53.1, 54.1; 204/159.14; 526/266, 268, 270

[56] References Cited

U.S. PATENT DOCUMENTS

| | | | |
|---|---|---|---|
| 2,902,476 | 9/1959 | Kern et al. | 526/266 |
| 2,970,985 | 2/1961 | Guest et al. | 526/266 |
| 2,975,156 | 3/1961 | Fekete | 526/266 |
| 3,770,602 | 11/1973 | D'Alelio | 427/44 |
| 3,935,364 | 1/1976 | Proksch et al. | 427/44 |
| 4,031,271 | 6/1977 | Bush | 427/44 |
| 4,057,657 | 11/1977 | Garnett et al. | 427/44 |
| 4,070,497 | 1/1978 | Wismer et al. | 427/54.1 |
| 4,119,617 | 10/1978 | Hanyuda et al. | 526/270 |

*Primary Examiner*—John H. Newsome
*Attorney, Agent, or Firm*—Wenderoth, Lind & Ponack

[57] ABSTRACT

This invention relates to a method for improving surface properties of a porous inorganic material, which comprises coating said material with an infiltratable photopolymerizable paint containing unsaturated spiroacetal resin as one or more layers in environmental atmosphere to infiltrate said paint into said material and then exposing the resultant material to ultraviolet radiation.

10 Claims, No Drawings

METHOD FOR IMPROVING SURFACE PROPERTIES OF POROUS INORGANIC MATERIAL BY COATING

This invention relates to a method for improving surface properties of a porous inorganic material such as a substrate by coating said material with an infiltratable light-curable paint.

Generally, an inorganic material having a porous water-absorptive surface is liable to be stained with dirty materials by water, and soluble dirty materials dissolved in solvent infiltrate into the porous surface of the inorganic material. It is often almost impossible to clean the surface thus stained. Particularly, set hydraulic material causes efflorescence and precipitates salt cake on its surface by water, which results in contamination. The inorganic material absorbing water causes growth of fungus, which also results in contamination. During winter, water infiltrates into the surface of a porous inorganic material freezes and thaws, thus damaging the surface. As mentioned above, the conventional porous inorganic materials have the various disadvantages of being liable to staining and damage.

Thus, an object of the present invention is to provide a method for improving the surface properties of building finishing materials having porous and water-absorptive surfaces by infiltrating a light-curable infiltratable paint into said porous and water-absorptive surface to a suitable degree and light-curing the infiltrated paint. The curing time and cured state can be freely controlled, thus providing water-impermeable, strong and hard surface having a good appearance, which inhibits efflorescence, the precipitation of salt cake and the growth of fungus, and which has various excellent properties such as resistance to heat, resistance to dirt, resistance to chemicals, resistance to solvents, durability and resistance to cold.

Heretofore, surface properties of porous inorganic materials have been modified by coating with a paint or impregnating with resin, but the durability of the surface thus modified was insufficient. Moreover, it is technically difficult to modify the surface only, and accordingly the inorganic material must be treated all over, thus the treatment cost becomes too expensive for practical use. It is known to coat a porous and water-absorptive inorganic material with a paint (i) curable by evaporating water or solvent, for example stucco finish paint, emulsion paint, fiber-filled wall paint or air-curing type alkyd paint for the purpose of making the appearance beautiful, but good surface properties as mentioned above can not be obtained. It is also known to improve properties and appearance of a porous and water-absorptive inorganic material by impregnating with a paint (ii) of a very low viscosity comprising prepolymer or monomer containing a radical generator and then curing the prepolymer or monomer at room temperature or elevated temperature. However, according to this conventional method, it takes a long time for polymerization and polishing, thus productivity is low. Accordingly, from an economical point of view, an inorganic material to be treated should preferably be relatively large, but a large material is difficult to impregnate, thus the selection of the shape and size of the inorganic material to be treated by the conventional method is restricted. Moreover, since polymerization of monomers on a surface in contact with air is inhibited, it is very difficult to impregnate monomers into a selected part of the surface only. Therefore, a monomer is infiltrated into the deep inner part of the inorganic material, and is cured therein. In this case, a large amount of resin is impregnated into the inorganic material, and accordingly fire resistance becomes poor, thus the use of this material as an interior building material is limited. In this method, the curing of the impregnated material is carried out at normal or elevated temperature by using organic peroxide as a radical generator.

Volume shrinkage of the above mentioned conventional paints (i) and (ii) caused during curing is very large, and therefore an opening is formed between the resin and an inorganic substrate material. Thus, it is very difficult to obtain a completely water-tight coating layer. Consequently, cracks are easily formed from the openings, thus resulting in the separation of the coating layer from the substrate material.

We have studied how to improve surface properties of porous and water-absorptive inorganic substrate materials, and have found that a satisfactory product which does not have the above mentioned defects can be obtained by using a light-curable paint containing unsaturated spiroacetal resin.

Accordingly, the present invention resides in a method for improving surface properties of a porous inorganic substrate such as set hydraulic materials, unglazed pottery, bricks, water-absorptive stones, set materials of slag or the like, characterized by coating said substrate with an infiltratable light-curable paint in environmental atmosphere to infiltrate said paint into said substrate to a depth of 5–5000 microns and then exposing the resultant substrate to ultraviolet radiation. Thus, according to the method of this invention, the light-curable paint is gelled in a moment by ultraviolet radiation, and therefore the improvement of the surface properties can be satisfactorily effected since the infiltration condition of the paint can be freely controlled simply by controlling the viscosity of the paint and the gelling of the paint can be effected in situ. In the conventional system using a cold-curing catalyst, gelling takes several minutes at the quickest even when a curing accelerator is used. During this gelling time, most of the paint deeply infiltrates into the inner part of the substrate material, and the paint does not stay on the surface, thus the conventional curing system is unsuitable for improving the surface properties. On the other hand, according to the present curing system using ultraviolet radiation, gelling or curing of the paint proceeds only when exposed to ultraviolet radiation, and when the irradiation of ultraviolet light is stopped, the gelling or curing is instantly stopped. Therefore, a very elaborate coating schedule can be effected, and the curing rate can be freely controlled in accordance with the change in the infiltration condition of the paint into inorganic material. Moreover, according to the conventional heat-curing system, a porous inorganic material having a low thermal conductivity takes a long time to be heated when environmental temperature is raised, and therefore the curing time becomes long. According to the present curing system using ultraviolet radiation, there is no problem such as that mentioned above. The present curing system using ultraviolet radiation is particularly preferable when an inorganic substrate material contains a set hydraulic material such as cement, gypsum or the like as a binder since it is preferable not to heat this kind of substrate material.

An apparatus equipped with a commercially available high pressure mercury vapor lamp or metal halide lamp can be used as an ultraviolet light irradiation apparatus. Ultraviolet rays generated by a high pressure mercury vapour lamp scarcely reach the deep inner part of the material, but make the curing time shorter. On the other hand, ultraviolet rays generated by a metal halide lamp reach the deep inner part of the material. It is accordingly preferable to combine the advantages of the two lamps.

The paint of the present invention should preferably be infiltrated into the surface of the substrate material to a depth of 5–5000 microns. If the infiltration layer of the paint is too thin, for example less than 5 microns, the anchor effect of the paint is not sufficient for the paint to bond strongly with the inorganic material, and the surface of the inorganic material is not satisfactorily reinforced. The gelling conditions of the paint of this invention are influenced by various factors such as the type of paint and its viscosity, the type of ultraviolet radiation and its output, irradiation distance, irradiation time, the type of sensitizer and its amount, the type of dye or pigment and the amount added, the type of filler and its amount, the type of inorganic material and its porosity, and the like. Generally, the irradiation time of ultraviolet radiation is from 0.5 second to 5 minutes, preferably from 1 second to 1 minute, and the viscosity of the paint is from 0.5 poise to 300 poises, preferably from 2 poises to 100 poises. If the viscosity of the paint is less than 0.5 poise, the infiltration of paint becomes too large, and is unsuitable for the purpose of the present invention. On the other hand, if the viscosity of the paint is more than 300 poises, the infiltration becomes insufficient, and therefore satisfactory anchoring effect and reinforcing effect can not be achieved. If the paint is infiltrated into a substrate material to a depth of more than 5000 microns, there will be parts where the ultraviolet rays do not reach, and accordingly there will be uncured parts. As mentioned above, even in the case of a thicker substrate material, a thickness of the infiltration layer of up to 5000 microns is sufficient. However, depending on the use of the substrate material, it is sometimes necessary to reinforce a part deeper than 5000 microns. In such cases, the curing system using ultraviolet ray may be used in combination with the conventional curing system. By this combination method, the remaining parts where ultraviolet rays do not reach can be cured by the conventional method although the curing takes a little more time. Thus, the uncured paint generating an unpleasant smell is cured, and the whole infiltration layer is completely cured to achieve a satisfactory reinforcing effect. In view of production speed and infiltration condition of paint into a porous substrate material, the irradiation time of the ultraviolet rays is generally from 0.5 second to 5 minutes, preferably 1 second to 1 minute. Thus, the paint is gelled or cured virtually instantly.

Paint may be coated once or twice. A single coating is sufficient for the purposes of reinforcement, improvement of brittleness, prevention of absorption, prevention of contamination, prevention of efflorescence and the like. For the purpose of improving appearance and weather resistance in addition to the above mentioned properties, a double coating is preferable. In the event of a double coating, paints for the under-coating can be freely selected, and ultraviolet radiation sources can also be freely selected. Generally, a more satisfactory product can be obtained by using a first coating paint different from the second coating paint depending on the type of an inorganic material and environment where the product is used. For example, in the case of a material containing cement as a binder, the first coating paint may be a light curable paint containing an alkali-resistant resin such as vinyl ester resin, and the second coating paint is a light curable unsaturated spiroacetal resin paint having excellent weather-resistance. Also, a coating having a good adhesion and no cracks can be obtained by using a relatively soft resin such as light curable unsaturated acryl urethane resin having a relatively low hardness as the first paint. It is also convenient for the present invention that an ultraviolet radiation source can be freely selected. For example, for the first coating, the use of a metal halide lamp, the ultraviolet radiation of which reaches the deeper interior of the material, is preferable, and for the second coating, a high pressure mercury vapor lamp which provides a higher curing speed is preferable. As long as the porosity of a substrate material is not too high, the respective coatings are separately cured as a rule, and accordingly the second coating is applied after the first coating is gelled and cured.

However, when inorganic material has an extremely highly porous surface and a paint is very greatly infiltrated, adhesion between the under-coating and the over-coating applied by the above mentioned process is insufficient, and the two coating layers are liable to separate by shock, which occasionally leads to a critical defect. Such being the case, the following process is carried out to improve the adhesion between the under-coating and the over-coating so that the two layers do not separate by shock. That is, before the first paint is completely absorbed by the inorganic material, i.e. while the first paint still stays on the surface of the substrate material, ultraviolet radiation is applied to gel the paint and the paint is maintained at the state of gel, thus preventing a part of the paint from infiltrating into the inorgaic material. This step of stopping the paint at the stage of gel can be very easily carried out since the paint is instantly gelled by ultraviolet radiation and the gelling of the paint is also instantly stopped when the exposure to ultraviolet radiation is stopped.

The second paint coating may be applied on the first paint of the above mentioned state immediately or after an appropriate time. Then, both the first and the second coatings are completely cured by ultraviolet radiation. According to the above mentioned process, the adhesion between the first paint coating and the second paint coating is even better than expected. This is probably because the second paint is applied while the first paint is still in the state of gel and the first paint is partly etched by the second paint. If the second paint is applied after the first paint is completely cured, the adhesion between the two layers is not so satisfactory. This step is also desired in the case of coating a paint more than twice. That is, the first paint is gelled by ultraviolet radiation while a part of the paint remains on the substrate surface. The second paint is then applied on the gelled first paint and the second paint is gelled by ultraviolet radiation in the same manner as in the first paint. Then, the third paint is applied on the gelled second paint. In this manner, after the final paint is coated, the whole paint coatings are completely cured. Another advantage of the above mentioned step of maintaining the former paint at the stage of gel is that the coating film at the stage of gel has tackiness and therefore appropriately prevents the subsequent paint from flowing. Thus, an indented design on the undercoated surface is faithfully retained even after overcoating. The above mentioned step is therefore very useful for the purpose of correctly retaining the indented design of an undercoated surface.

The important point of the above mentioned step is to apply ultraviolet radiation before the undercoating paint has completely left the surface of the inorganic material by infiltration, and thereby to gel when at least a part of the undercoating paint remains on the surface of the inorganic material. That is, according to the present invention, ultraviolet radiation is applied when the first paint is infiltrated into an inorganic material to a depth of 5 to 5000 microns in accordance with the desired use, and when a part of the paint still remains on the surface of the inorganic material.

An inorganic material to be treated in accordance with the present invention is a porous and water-absorptive inorganic substrate material having many fine pores, and its water absorption rate is from several percent to several tens percent. Examples of the inorganic material include cement mortar products, concrete products, artificial stones having designs formed by aggregates and containing white cement as a binder, substrates comprising cement as a binder and divided cured polyester plate containing artificial pearl flakes as an aggregate, unglazed pottery, gypsum products (e.g. a substrate comprising gypsum, a substrate comprising a blend of a gypsum binder and aggregates or a substrate comprising a blend of a gypsum binder and aggregates forming a design), bricks, artificial porous stones made from slag of a blast furnace and natural porous stones (e.g. tuff, marble, granite, sand stone and the like).

A light curable paint used in accordance with the present invention contains a resin having a molecular weight of 300 to 200,000 and having more than one light curable unsaturated bond per molecule. The main chain is composed of carbon to carbon bonding, and the main chain molecules are bonded by means of a spiroacetal bond, urethane bond, ester bond, ether bond, amino- or amide bond and/or the bond obtained by vinyl monomer polymerization. The resin having the bond obtained by vinyl monomer polymerization has a double bond on its branched chain which makes a cross linking reaction. The light curable paint as mentioned above can be coated on an inorganic material in the form of one or more layers, but it is essential for the present invention that at least the outermost coating layer comprises unsaturated spiroacetal resin.

A resin prepared by dissolving in a monomer of styrene alone an unsaturated polyester obtained by esterifying a polyhydric alcohol with α,β-unsaturated polybasic acid as one component with or without modification by an optional saturated acid has various disadvantages that it has styrene smell; that it takes a long time to cure; and that it is necessary to add wax since without wax the surface hardness is insufficient. However, this resin can be used if styrene is used in combination with other monomers such as acrylic acid ester and methacrylic acid ester of polyhydric alcohol, and acrylic acid ester and methacrylic acid ester of glycol monoether.

Thus, the vehicle of a light curable paint suitable for use as an overcoating in the present invention is unsaturated spiroacetal resin composed of spiroacetal bond and having more than one unsaturated bonds, for example resins obtained by reacting diallylidene pentaerythritol with unsaturated alcohol or unsaturated carboxylic acid containing an acryloyl group, the general formulas of which are as follows:

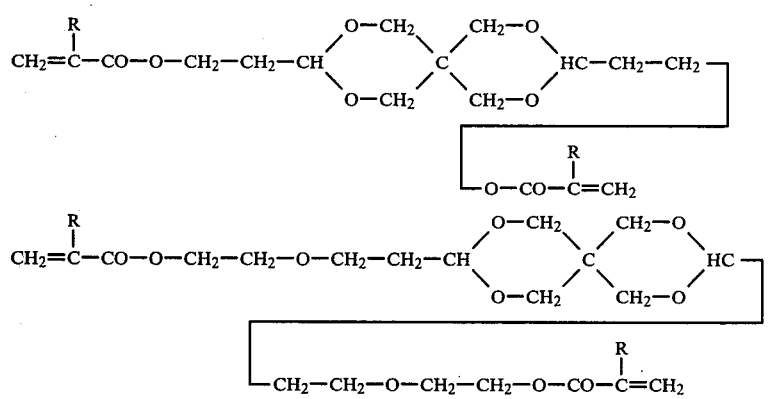

wherein R represents H or CH$_3$.

The above-mentioned reaction product of diallylidene pentaerythritol is the most typical spiroacetal compound, and is excellent in weather resistance and stain resistance, and therefore suitable for the purposes of this invention.

The other advantages of the spiroacetal resin are that there is substantially no shrinkage during curing; that the cured surface is tough and hard, and does not crack; and that it has an excellent transparent appearance which does not turn yellow.

Resins obtained by reacting at least one of hydroxy polyester, hydroxy polyether, and carboxy polyester in combination with the above mentioned components impart toughness to a coating film, and are useful depending on use.

Resins which can be used as an undercoating in the present invention are as follows:

(a) Unsaturated acryl urethane resin containing more than one acryloyl radical or methacryloyl radicals.

For example, (i) Reaction product of unsaturated alcohol containing an acryloyl radical with polyester containing two or more hydroxyl radicals, polyether and diisocyanate, which is expressed by the following general formula:

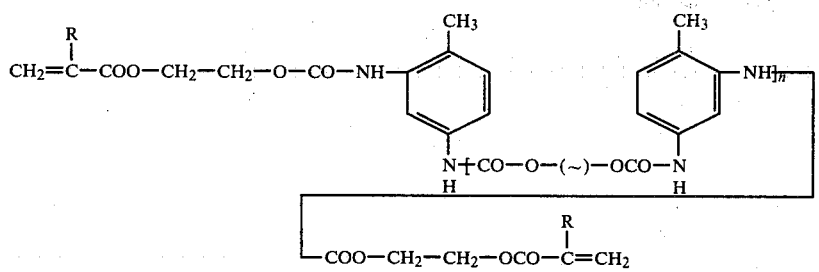

wherein n represents 0 or 1–10, R represents H or CH$_3$, and the part (~) represents polyester or polyether residue; and (ii) Resin obtained by reacting polyfunctional isocyanate with unsaturated hydroxy polyester prepared by reacting alkylene oxide with acrylic acid, methacrylic acid or polybasic acid anhydride, which is expressed, for example, by the following general formula:

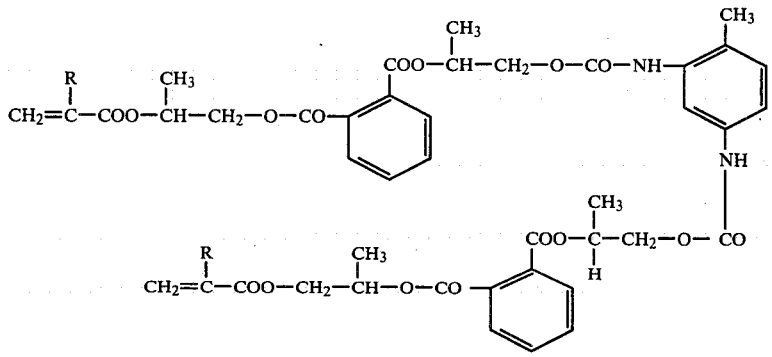

wherein R represents H or CH$_3$.

(b) Vinyl ester resin obtained by reacting acrylic acid or methacrylic acid with epoxy resin containing one or more epoxy radicals per molecule. This resin is highly alkali-resistant, and is suitable for use as an undercoating for an alkaline substrate. This resin may be modified with saturated polybasic acid or its anhydride, carboxy polyester or polyhydric phenol. The basic structure of this resin is expressed by the following general formula.

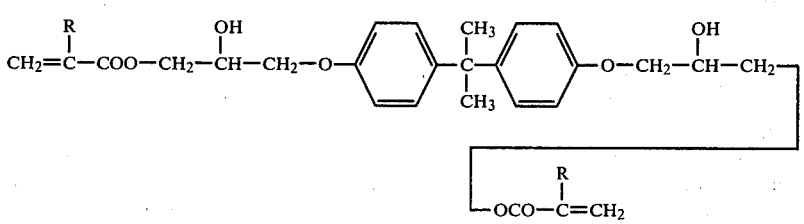

wherein R represents H or CH$_3$.

(c) Unsaturated polyester acrylate containing more than one acryloyl radical or methacryloyl radical per molecule.

The typical resin is prepared by reacting polybasic acid anhydride with unsaturated epoxy compound such as glycidyl acrylate or methacrylate, and is expressed by the following general formula:

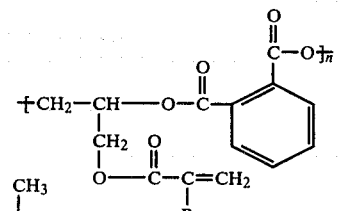

wherein R represents H or CH$_3$, and n represents 2–20.

Also, the system comprising polyhydric alcohol, polybasic acid or its anhydride, acrylic acid or methacrylic acid may be directly esterified in the presence of an acidic catalyst. The system comprising the combination of polyfunctional acrylate monomer with unsaturated polyester containing α,β-unsaturated polybasic acid is also usable, but this system provides no merits in respect of curing time and hardness.

(d) Polymer, the main chain of which is obtained by polymerization of vinyl monomer, and which has more than one acryloyl radical or methacryloyl radical in its side chain. The typical resin is expressed by the following general formula:

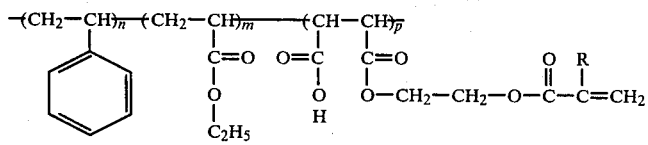

wherein R represents H or CH₃ radical, and n, m and p represent an integer.

This resin is obtained by reacting styrene-acrylic acid ester-maleic anhydride type copolymer with unsaturated alcohol containing an acryloyl radical. The resin thus obtained has high toughness, acid-resistance and weather-resistance, and accordingly is very useful.

(e) Unsaturated acryl amine or amide resin having more than one active hydrogen bonded with nitrogen atom per molecule as in polyamide or polyamine, and having more than one acrylic unsaturated bond per molecule introduced by reacting with acrylic unsaturated epoxy compound. A typical example using amine is expressed by the following general formula:

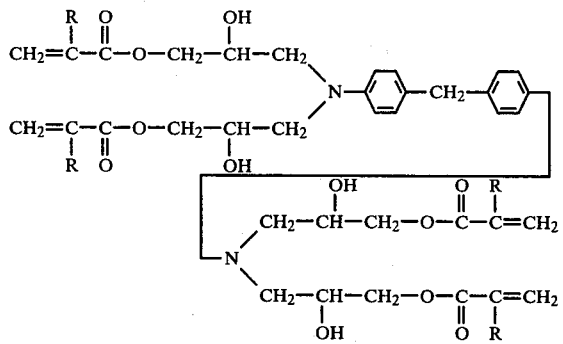

wherein R represents H or CH₃ radical.

The above listed various unsaturated acrylate type oligomer or resins are all usable in the present invention and provide useful cured films. "Resin" used in the present invention means the above listed various resins respectively alone or mixture thereof or a blend of the above mentioned resin with monofunctional or polyfunctional reactive monomers such as 1,4-butanediol diacrylate, trimethylolpropane triacrylate, pentaerythritol triacrylate, dipentaerythritol polyacrylate, hexanediol diacrylate, styrene, vinyl toluene, chlorostyrene and the like. It is necessary for curing by ultraviolet radiation to use a generally used photosensitizer such as benzoin, ethers of benzoin and a combination of benzophenone with amine. If the first paint is infiltrated into a deeper part of a substrate and the curing by ultraviolet radiation is not sufficient, a combination of a radical generator such as organic peroxide with a curing accelerator such as cobalt naphthenate may be used.

A combination of a porous inorganic substrate material with a light-curable paint can be optionally selected. However, nitrogen-containing unsaturated acrylate discolors day by day, and therefore it should not be used where a light color is required although it can freely be used as a primer.

Fillers, coloring agents, e.g. dye or pigment may optionally be added to the light-curable paint of this invention so long as these additives do not disturb the light curability. Coloring agent, e.g. pigment should preferably not absorb ultraviolet ray but reflect ultraviolet ray. There are no restrictions with regard to dye.

The present invention is further illustrated by the following Examples, but it should not be limited thereto.

EXAMPLE 1

Synthesis of Light-Curable Spiroacetal Resin

Diallylidene pentaerythritol 212 g, 2-hydroxyethyl acrylate 200 g, p-toluene sulfonic acid 2 g and hydroquinone 0.2 g were placed in a one liter-three necked flask equipped with a stirrer, cooling condenser and thermometer, and the resultant mixture was reacted at 90° C. for 5 hours. According to infrared analysis, about 90% of the free hydroxy group had disappeared. To this reaction mixture, dimethyl aminoethanol 4 g and benzophenone 4 g were added to prepare light curable spiroacetal resin (A). The resin thus prepared was light yellowish brown and had a viscosity of about 5 poises.

Coating of Gypsum Tile

A slurry of α-type gypsum hemihydrate 100 parts, water 37 parts and glass fiber 0.5 part was poured into a mold of 300 mm×300 mm×10 mm having an indented design prepared by vacuum-forming polyvinyl chloride sheet, and was cured. After curing, a gypsum plate having the indented design on its surface was obtained, and was removed from the mold. The surface of the gypsum plate having the design was uniformly coated with the above prepared light curable spiroacetal resin (A) by a sponge roll impregnated with the above resin (A). The gypsum plate thus coated was then immediately carried on a conveyor at a speed of 10 m/min through an ultraviolet ray generating apparatus equipped with a high pressure mercury vapour lamp of an output of 12 kw, thus gelling the resin. The gelling time was about 10 seconds. The gypsum plate thus treated was coated again to a thickness of 150μ by a flow coater, and was cured in the same apparatus as mentioned above at a conveyor speed of 2.6 m/min. The curing time required was about 3 seconds.

The gypsum plate obtained in this manner was a tile of beautiful design having a pencil hardness of 4-5 H and an appearance which to the naked eye is hardly distinguishable from ceramic ware.

In order to measure the thickness of the cured coating film, the gypsum plate was cut, and the cut section was polished and checked by a microscope. As the result, it was found that the thickness of the coating film was about 220-250μ, and that the thickness of the infiltration layer of the paint into gypsum was about 250-300μ. When the coating film was peeled, the film was separated between the infiltration layer and the non-infiltration layer.

EXAMPLE 2

Dark green spherical material 100 parts having a diameter of 2-5 mm and prepared from slag was mixed with unsaturated polyester resin 10 parts containing a curing agent, and the mixture was maintained at 80° C. for 30 minutes under a pressure of 100 kg/cm$^2$ to prepare a porous plate of 30 cm×30 cm×1 cm.

Synthesis of Light-curable Unsaturated Acryl-Amine

Tetraethylene pentamine (containing a small amount of triethylene tetramine) 180 g and hydroquinone 0.3 g were placed in a one liter-four necked flask equipped with a stirrer, thermometer, reflux condenser and dropping funnel, and glycidyl methacrylate 426 g was added thereto drop-wise. After finishing the dropping, the content was caused to react at 60° C. for 3 hours. The resin obtained by adding 1,4-butanediol dimethacrylate 100 g to the reaction product was deep red brown. To this resin, benzophenone 18 g and dimethyl aminoethanol 9 g were added to prepare a light-curable unsaturated acryl-amine resin. The viscosity of this resin was about 90 poises. The above obtained resin was uniformly coated on this porous plate by means of a spatula, and the coating was gelled by passing the plate through a metal halide type ultraviolet ray generating apparatus of an output of 20 kw at a speed of 6 m/min. The gelling time required was about 6 seconds. Furthermore, the light curable spiroacetal resin prepared in Example 1 was spray-coated on the above coated plate to a thickness of 100µ, and the coating was cured at a conveyor speed of 3.3 m/min in a ultraviolet ray generating apparatus equipped with a high pressure mercury vapour lamp of an output of 12 kw. In this manner, a wall material having a beautiful appearance and a surface hardness of 4 H was obtained. The plate thus obtained was cut, and the cut section was checked. Consequently, it was found that the thickness of the coating film was about 100µ, and that the resin was infiltrated into the inner part of the plate to a thickness of 100-3000µ and the resin of the deepest part was also completely cured.

EXAMPLE 3

A red brown unglazed pottery plate of 20 cm×20 cm×1 cm was coated with the light-curable spiroacetal resin mentioned in Example 1 containing methyl ethyl ketone peroxide 0.8% by weight and cobalt naphthenate (metal content: 6%) 0.5% by weight. The coating was repeated three times by a flow coater adjusted in such a manner as to give a coating thickness of 200µ. Thus, the whole coating thickness was 600µ. The coating was then allowed to stand at room temperature for 8 minutes, and was cured at a conveyor speed of 3.0 m/min in the same ultraviolet ray generating apparatus equipped with a metal halide lamp as used for gelling the first coating in Example 7.

After curing, the pottery plate was cut, and the cut section was checked. It was found that the thickness of the coating film was about 10-50µ, and that the resin was infiltrated into the substrate to a thickness of 1000-1300µ. The infiltrated part was also completely cured.

EXAMPLE 4

The unsaturated spiroacetal resin as prepared in Example 1 was coated on a set gypsum plate of 300 mm×300 mm×10 mm to a coating thickness of 600µ by a flow coater. The plate thus coated was allowed to stand for 20 minutes to degas, and the plate having the uniform coating was passed at a conveyor speed of 3 m/min through the same ultraviolet ray generating apparatus equipped with a high pressure mercury vapor lamp of an output of 12 kw as used in Example 1. The surface of the decorative gypsum plate thus obtained had a pencil hardness of 2 H. The thickness of the infiltration layer was 300–350µ, and the thickness of the coating film on the surface was about 250µ.

What we claim is:

1. A method for improving the surface properties of a porous inorganic material which comprises
applying to said material at least one coating of an infiltratable light-curable paint having a viscosity of 0.5 to 300 poise, allowing the first coating of said paint to infiltrate into said material and exposing the paint to ultraviolet radiation so that the depth of infiltration of paint into the porous inorganic material is from 5 to 5000 microns, at least the outermost paint coating being an infiltratable light-curable paint consisting essentially of unsaturated spiroacetal resin.

2. A method according to claim 1 wherein the unsaturated spiroacetal resin is obtained by reacting diallylidene pentaerythritol with unsaturated alcohol having an acryloyl or methacryloyl group.

3. A method according to claim 1 wherein a plurality of paint coatings are applied, the first paint coating applied to the porous inorganic material being an infiltratable light-curable paint different from the paint consisting essentially of unsaturated spiroacetal resin.

4. A method according to claim 1 wherein the porous inorganic material is coated with a single coating of an infiltratable light-curable paint consisting essentially of unsaturated spiroacetal resin.

5. A method according to claim 1 wherein the porous inorganic material is coated with a plurality of coatings of an infiltratable light-curable paint consisting essentially of unsaturated spiroacetal resin.

6. A method according to claim 1 wherein a first paint coating of an infiltratable light-curable paint is applied to the porous inorganic material and is at least partially cured by exposing to ultraviolet radiation, said at least partially cured first paint coating is subsequently overcoated by an infiltratable light-curable paint consisting essentially of unsaturated spiroacetal resin which is then exposed to ultraviolet radiation.

7. A method according to claim 6 wherein the first paint coating is only partially cured by exposing to ultraviolet radiation, the overcoating paint is applied over the partially cured first paint coating and the coatings are exposed to ultraviolet radiation to effect complete curing.

8. A method according to claim 3 wherein the first paint coating contains an unsaturated acrylate type resin.

9. A method according to claim 1 wherein the water absorption rate of said inorganic material to be treated is from several percent to several tens percent.

10. A method according to claim 1 wherein said inorganic material is selected from the group consisting of cement mortar products, concrete products, unglazed pottery, bricks, gypsum products and marble.

* * * * *